Patented Apr. 26, 1927.

1,626,558

UNITED STATES PATENT OFFICE.

ALBERT ROTHMANN, OF HEIDELBERG, AND HELMUT STEIN, OF MANNHEIM, GERMANY, ASSIGNORS TO C. F. BOEHRINGER & SOEHNE G. M. B. H., OF MANNHEIM-WALDHOF, GERMANY.

ART OF MAKING BISALKYL-XANTHOGENS.

No Drawing. Application filed December 12, 1924, Serial No. 755,555, and in Germany January 28, 1924.

This invention relates to the art of manufacturing bisalkyl-xanthogens (oxy-alkyl-thio-carbonic acid disulfides) which have been shown to possess valuable therapeutic properties. They are distinguished by antiparasitic action and have been found to be particularly valuable for preventing and curing scab, itch (scabies and acarus-itch) and mange to which dogs and other animals are subject. However, their employment for such purposes, has been found objectionable or difficult because the bisalkyl-xanthogens hitherto produced are characterized by a disagreeable pungent and acrid odor, which is undoubtedly due to the fact that it has not been possible, heretofore, to obtain them in chemically pure condition. Thus the bisethyl-xanthogen obtained according to the directions given in Annalen der Chemie und Pharmacie, vol. 72 (1849) page 5 possess a biting and pungent odor while bispropyl-xanthogen prepared according to Gazzetta Chimica Italiana, vol. 17 (1887) p. 80, is characterized by an unpleasant, sharp, resinous smell.

It is the object of the present invention to obtain these products in a purified condition and to free them from the disagreeable odors and we have found in the course of our experiments and investigations that a bisalkyl-xanthogen which is free from all disagreeable pungent and acrid odors, and which is substantially odorless or, more generally speaking, never possesses more than a weak, mild, ester-like odor, free from disagreeable smells associated with the known product, can be obtained by subjecting the crude bisalkyl-xanthogens, prepared according to the methods heretofore known, to the action of a strong current of an indifferent gas such as air or steam. This treatment we carry out by passing the air or steam current through the bisalkyl-xanthogen in a liquid, dissolved or suspended condition at ordinary or raised temperature and, in certain cases, in vacuo.

The purification of these compounds may also be advantageously attained by mixing an indifferent gas, such as air or steam, with chlorine-gas employed for oxidizing alkali-alkyl-xanthogenates. In this case the purified bisalkyl-xanthogens, are obtained directly in an odorless or agreeably smelling condition.

The following examples embody the preferred manner of carrying out our invention.

Example 1.

One hundred parts by weight of potassium ethylxanthogenate as obtained by methods hitherto known are dissolved in one thousand parts by volume of water. Through this solution cooled to the temperature of ice a strong current of air containing from about 5 to 10 percent of chlorine gas is passed. This treatment with air and chlorine results in the immediate precipitation of bisethyl-xanthogen in crystalline form and it is continued until a sample of the residual watery liquid when treated with cupric sulfate will yield no further precipitate of copper-xanthogenate. This crystalline precipitate is placed on the filter and freed from the adhering liquid by suction. The thus dried precipitate remaining on the filter is then dissolved in ether. In order to remove such small quantities of water as still remain in the mass after the above suction-filtration, a sufficient amount of dehydrated sodium-sulfate is added to the solution of the precipitate in ether, whereby any small quantities of water still remaining are bound after the lapse of several hours. The amount of sodium sulfate thus added varies according to the degree of moisture, about 10 grams of sulfate thus added having been found sufficient in most cases. After the completion of this dehydration the ether solution is freed from the sodium sulfate by filtration and the ether is distilled off from the filtrate. The residue forms a light-yellow oily liquid which soon solidifies to a crystalline mass whose melting point is between 31° and 33°, and approximating 32°, centigrade, which distinguishes it from the product hitherto obtained and having a melting point of 27° to 28°, centigrade. This new purified product is readily soluble in ether, in carbon-tetrachlorid and in benzene, and soluble with difficulty in cold alcohol. In contradistinction to the product hitherto obtained and described it is almost odorless, and free from all disagreeable pungent or acrid odors. The fact that its melting point is much higher than that of the product heretofore known, for which a melting point of 27°–28°, C. is given confirms the assumption that the former product was impure. By our process it has for the first time been obtained in a pure state.

Example 2.

Bisethyl-xanthogen obtained by the action of chlorine on a dilute aqueous ten per cent solution of potassium ethylxanthogenate and having a disagreeable pungent odor is washed repeatedly with water and thereupon several times its volume of water is poured on top of the same. It is then distilled in vacuo over a water bath at a temperature of from 80° to 90°, centrigrade, at 35 millimeters pressure and in a current of steam. The process of distillation is continued until the oily liquid remaining in the still has lost its pungent smell. The bisethyl-xanthogen is then separated from said oily residue by the usual methods. The properties of the new product thus obtained are the same as those enumerated for the product of Example 1.

Example 3.

Crude bisethyl-xanthogen having a penetrating pungent odor is dehydrated and then brought into a high cylinder or receptacle and therein subjected to the action of a current of dry air which is passed through the oily liquid until the penetrating pungent odor has disappeared. A product is thus obtained which has all of the properties of the product of Example 1.

Example 4.

Crude bispropyl-xanthogen prepared by the action of chlorine on propylxanthogenate of potassium and which is characterized by the pungent resinous odor is covered with a layer of water of several times its volume and subjected to a strong current of air at a temperature of about 50°, centigrade. The stream of air is passed through the oily material treated until a sample of the same is free from any pungent odor. The product so obtained, the purified bispropyl-xanthogen, is yellow in color and has a pleasant ester-like odor. After the action of the air current has ceased it is separated from the water and dried.

It is readily soluble in water, carbontetrachlorid and benzene but dissolves with difficulty in cold alcohol. It is liquid at ordinary temperatures.

It will be observed from the foregoing that in all cases our process of purifying bisalkyl-xanthogen, whether it be the crude product on the market or described in the literature, or the substance as it is being formed or generated in the course of treating an alkyl-xanthogenate with chlorine, involves as its primary characteristic the action on the said bisalkyl-xanthogen of an indifferent gas or gaseous agent, under which term, wherever used, we include air and steam. It will also be noted that under our invention the bisalkyl-xanthogen may be acted on alone in a liquid condition or combined with water that is to say, dissolved or suspended in or otherwise brought together with water.

What we claim and desire to secure by Letters Patent is:

1. The process of purifying an impure bisalkyl-xanthogen which consists in passing a current of an indifferent gaseous agent through the same.

2. The process of purifying an impure bisalkyl-xanthogen which consists in passing a current of air through the same.

3. The process of purifying bisalkyl-xanthogen which consists of subjecting the same to the action of an indifferent gas as it is being generated.

4. The process which consists in passing a current of an indifferent gas through impure bisalkyl-xanthogen combined with water.

5. The process which consists in passing a current of air through bisethyl-xanthogen as it is being generated.

6. The process which consists in passing a current of air through impure bisethyl-xanthogen combined with water.

7. The process which consists in passing a current of an indifferent gas through impure bisalkyl-xanthogen in vacuo.

8. The process which consists in passing a current of an indifferent gas through impure bisethyl-xanthogen combined with water in vacuo.

9. The process which consists in passing a current of an indifferent gas through impure bisalkyl-xanthogen combined with water and heating the whole.

10. As a new chemical product, purified bisethyl-xanthogen which is odorless, readily soluble in ether, carbontetrachlorid and benzene, difficultly soluble in cold alcohol and whose melting point is between 31° and 33°, and approximating 32°, centigrade.

In testimony whereof we hereunto affix our signatures.

ALBERT ROTHMANN.
HELMUT STEIN.